United States Patent
Martini et al.

(10) Patent No.: US 8,047,321 B2
(45) Date of Patent: Nov. 1, 2011

(54) HYBRID PROPULSION AND TRANSMISSION SYSTEM FOR MOTORCYCLES

(75) Inventors: Federico Martini, Pisa (IT); Alessandro Caleo, Massa Carrara (IT); Luca Carmignani, Pisa (IT); Paolo Capozzella, Frosinone (IT)

(73) Assignee: Piaggio & C. S.p.A, Pontedera, Pisa (IT)

( * ) Notice: Subject to any disclaimer, the term of this patent is extended or adjusted under 35 U.S.C. 154(b) by 0 days.

(21) Appl. No.: 12/450,140

(22) PCT Filed: Mar. 10, 2008

(86) PCT No.: PCT/IB2008/000653
§ 371 (c)(1), (2), (4) Date: Oct. 30, 2009

(87) PCT Pub. No.: WO2008/114127
PCT Pub. Date: Sep. 25, 2008

(65) Prior Publication Data
US 2010/0089682 A1   Apr. 15, 2010

(30) Foreign Application Priority Data
Mar. 16, 2007  (IT) .............................. MI2007A0528

(51) Int. Cl.
*B62D 61/02* (2006.01)

(52) U.S. Cl. ...................................... 180/220; 180/65.1

(58) Field of Classification Search .................. 180/220, 180/65.1, 214, 216, 65.24, 65.26, 65.285
See application file for complete search history.

(56) References Cited

U.S. PATENT DOCUMENTS

| | | | |
|---|---|---|---|
| 7,328,763 B2 * | 2/2008 | Gouda et al. | 180/65.285 |
| 7,426,973 B2 * | 9/2008 | Matsubara et al. | 180/65.25 |
| 2007/0169973 A1 * | 7/2007 | Masut et al. | 180/65.5 |
| 2007/0256873 A1 * | 11/2007 | Masuda et al. | 180/220 |
| 2008/0185205 A1 * | 8/2008 | Kaminokado | 180/220 |

FOREIGN PATENT DOCUMENTS

| | | |
|---|---|---|
| EP | 0 937 600 A | 8/1999 |
| EP | 937600 A2 * | 8/1999 |
| EP | 1 092 581 A | 4/2001 |
| EP | 1092581 A2 * | 4/2001 |
| EP | 1 518 737 A | 3/2005 |

* cited by examiner

*Primary Examiner* — Anne Marie Boehler
*Assistant Examiner* — Tashiana Adams
(74) *Attorney, Agent, or Firm* — Hedman & Costigan, P.C.; James V. Costigan

(57) ABSTRACT

Herein described is a hybrid propulsion and transmission system for a motorcycle of the type comprising at least an internal combustion engine (10) and at least one driving wheel (22). The system comprises a first electric machine (14), provided with first mechanical connection means (12) to the internal combustion engine (10), and a second electric machine (18), coupled with first electric machine (14) through electric and/or electronic connection means (16) and/or through second mechanical connection means (20), and coupled with the driving wheel (22) through second mechanical connection means (20).

16 Claims, 4 Drawing Sheets

HYBRID PROPULSION AND TRANSMISSION SYSTEM FOR MOTORCYCLES

The present invention refers to a hybrid propulsion and transmission system for motorcycles, in particular motor scooters.

Over the last years, great efforts have been made in the research aimed at reducing polluting emissions released by means of transport, in particular to tackle the situation regarding urban centres, in which often the quality of the air has reached alarming levels. This research, which at a first step mainly concerned motorcars and industrial vehicles, involved the two-wheeled motorcycle industry too a few years later. The research focused on two different fronts but with a common objective, that is the one of manufacturing less and less polluting vehicles.

Often, the research activities focused their attention on the alternative forms of propulsion, for example, hybrid propulsion systems. As a matter of fact, in such type of propulsion systems, an electric engine is added to the common internal combustion engine. The objective is that of optimising the overall efficiency of the vehicle, allowing the internal combustion engine to operate at elevated performance levels, to recover energy during deceleration and braking and, in some cases, to allow exclusive electric propulsion.

As of date, there are three main types of integrations between an internal combustion engine and an electric engine, defined "series hybrid", "parallel hybrid" and "combined hybrid".

In the "series hybrid" the internal combustion engine is not directly connected to the wheels, but it simply has the purpose of generating the power required to supply the electric engine which transforms such power into motion. Surplus energy is used to recharge batteries where provided. However, the greatest disadvantage of the "series hybrid" propulsion consists in a substantial reduction of efficiency with respect to using only the internal combustion engine, especially at constant and high speed conditions. This is due to the fact that, during the thermal energy/electric energy/motion conversion, part of the energy is dispersed. On the contrary, this does not occur under conventional transmissions of the direct type.

The abovementioned drawback is not present in the "parallel hybrid" type of engines, in which both the engines, both the electric engine and the internal combustion engine, are capable of supplying torque to the driving wheels of the vehicle. However, under normal conditions of use of vehicles with this type of engines there usually occurs a higher power supply from the internal combustion engine with respect to the power supplied by the electric engine, thus consequently relatively limiting polluting emissions and fuel consumption.

Lastly, in the "combined hybrid" type of systems there is the possibility to pass easily for the series system to the parallel system or vice versa. However, this entails a substantial increase in terms of manufacturing costs regarding this type of hybrid systems with respect to the type of systems mentioned beforehand.

Thus, the objective of the present invention is that of providing a hybrid propulsion and transmission system for motorcycles, in particular motor scooters, generally capable of overcoming the technical drawbacks described above.

In particular, it is an objective of the present invention to provide a hybrid propulsion and transmission system for motorcycles in which the internal combustion engine is independent from the wheels, guaranteeing maximum efficiency conditions for the entire propulsion system at the same time.

Another objective of the present invention is that of providing a hybrid propulsion and transmission system for motorcycles in which the internal combustion engine is always capable of operating under conditions of maximum efficiency, with remarkable fuel saving capacity and an almost complete reduction of emission of polluting substances.

Still, another objective of the invention is that of providing a hybrid propulsion and transmission system for motorcycles in which increase of manufacturing costs is marginal with respect to the hybrid propulsion systems of the traditional type.

These and other objectives according to the present invention are attained by providing a hybrid propulsion and transmission system for motorcycles as described in claim 1.

Further characteristics of the invention are outlined by the subsequent claims.

Characteristics and advantages of a hybrid propulsion and transmission system for motorcycles according to the present invention shall be clearer from the following description, exemplifying but non-limiting, with reference to the schematic drawings attached wherein.

Figure 1:
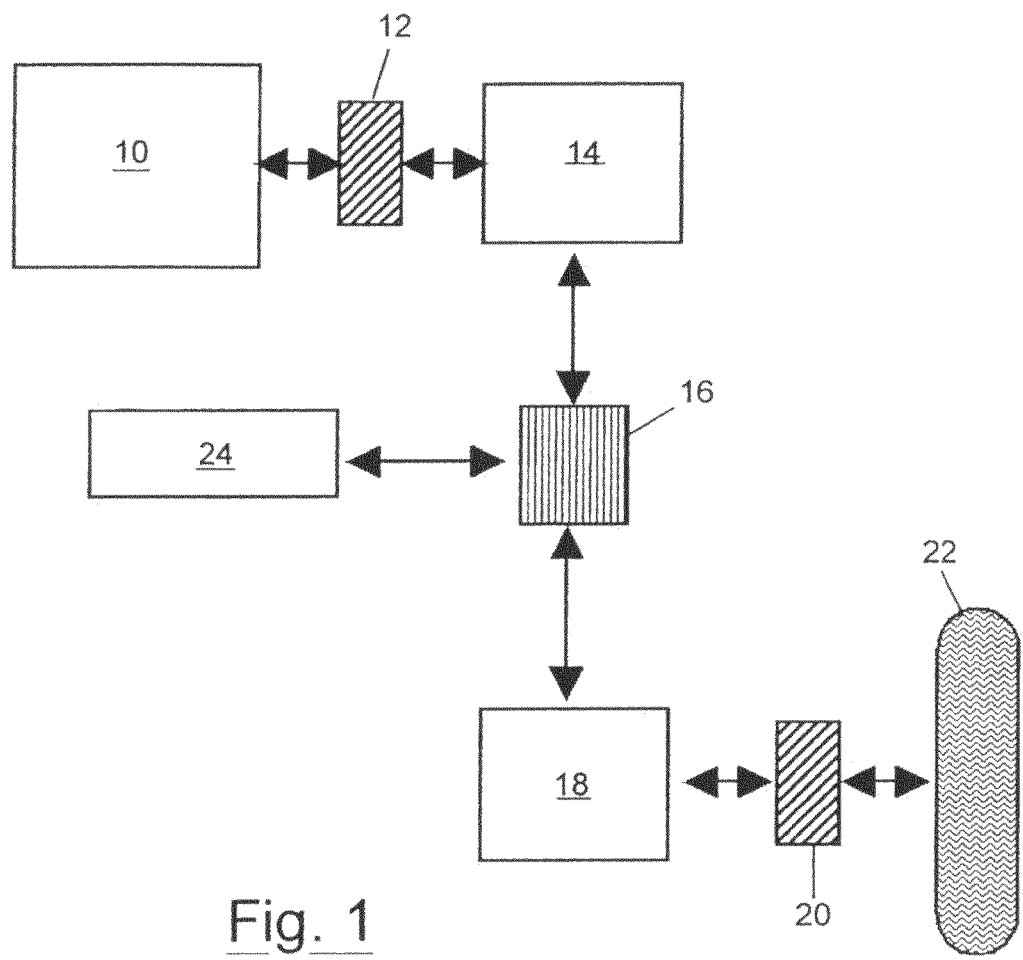
FIG. 1 is a schematic representation of a first embodiment of the hybrid propulsion and transmission system for motorcycles according to the present invention.

With reference in particular to FIG. 1, shown is a first embodiment of the hybrid propulsion and transmission system for motorcycles according to the present invention. In this configuration, defined "series hybrid", the system comprises above all an internal combustion engine 10, or thermal engine, provided with first mechanical connection means 12 to a first electric machine 14. The first electric machine 14, in turn, is connected through electric and/or electronic means 16, to a second electric machine 18 capable of transmitting motion, through second mechanical connection means 20, to at least one driving wheel 22 of the motorcycle.

In such configuration, the "series hybrid" is not provided with a direct mechanical connection between the thermal engine 10 and the driving wheel 22, but all the mechanical power supplied by the thermal engine 10 itself is converted into electric power, transferred to the electric machine 18 integrally joined to the wheel 22 which converts it again into mechanical propulsion power.

It should be pointed out that the above-mentioned first and second mechanical connection means 12 and 20 can comprise for example a connecting shaft, a belt (trapezoidal, synchronous, etc), a parallel axes reduction gear, an epicyclic reduction gear, a reduction gear with a worm and toothed wheel, a conical-wheeled reduction gear or other analogous means of then known type. In turn, the electric and/or electronic connection means 16, can be made in the form of diode bridges, inverters or other equivalent electric and/or electronic devices.

Furthermore, in a manner similar to the traditional hybrid propulsion systems, the presence of one or more accumulator devices 24 directly connected to the electric and/or electronic means 16 can be provided for. The accumulator devices 24, which can for example be made up of batteries based on Pb, Pb-gel, Ni—Mh, Li-Ion otherwise by supercapacitors, have the function of recovering the surplus electrical energy generated by the electric machines 14 and 18 in order to supply it, for example, to the various devices mounted on board the motorcycle, or to regulate the operation of the two electric machines 14 and 18 themselves.

In this embodiment of a hybrid propulsion and transmission system for motorcycles, in order to transfer the maximum power of the thermal engine 10 to the wheels 22, the electric machines 14 and 18 must be dimensioned to the maximum power of the thermal engine 10 itself. Therefore, in order to be converted into propulsion power, all the power generated by the thermal engine 10 must be subjected to a long conversion and transmission chain, reducing the overall performance of the system.

Figure 2:
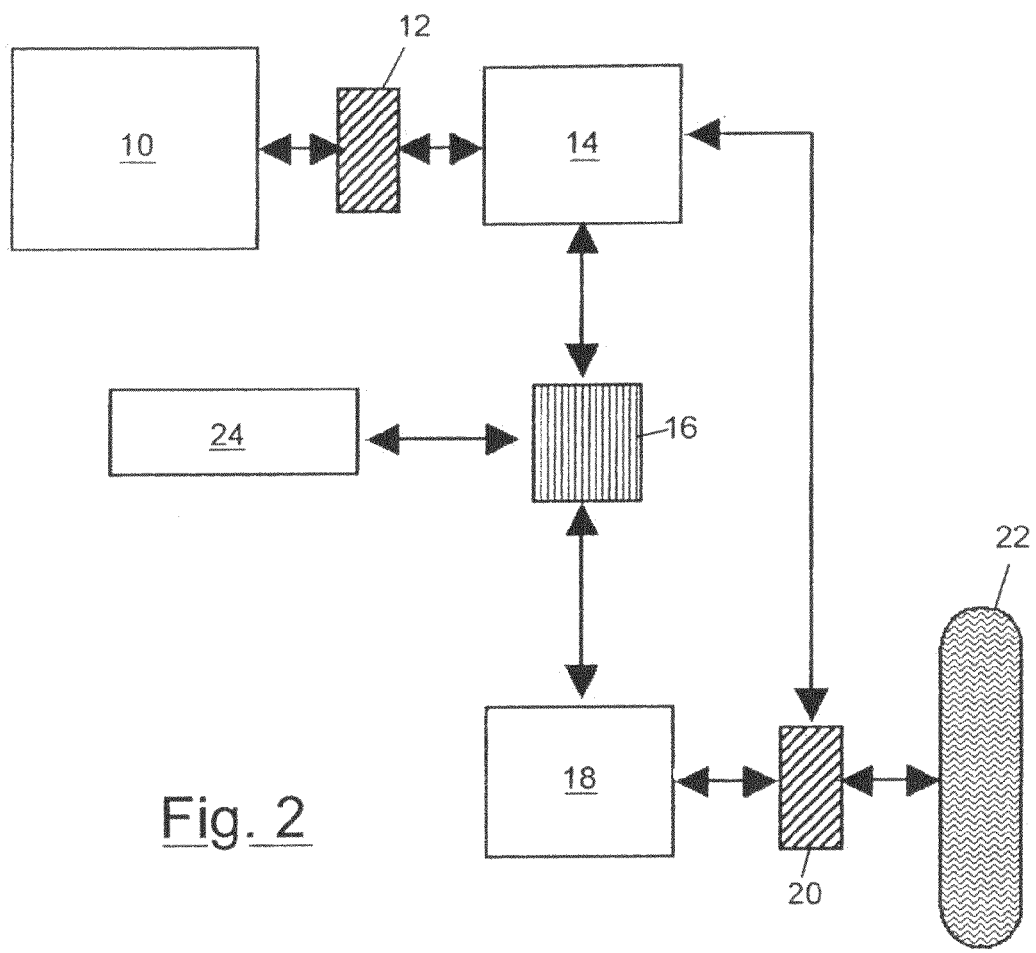
FIG. 2 is a schematic representation of a second embodiment of the hybrid propulsion and transmission system for motorcycles according to the present invention.

FIG. 2 shows a second embodiment of a hybrid propulsion and transmission system for motorcycles according to the present invention, defined "combined hybrid". In this embodiment, both the first electric machine 14 and the second electric machine 18 are directly connected to each other and to the driving wheel 22 of the motorcycle thorough the second mechanical connection means 20. In such manner, it is possible to transfer some of the power of the thermal engine 10 directly to the driving wheel 22. Thus, both the electric machines 14 and 18, which can operate both as generators and as propellers depending on the conditions of operation of the internal combustion engine 10, must supply a reduced amount of power with respect to the one supplied by the engine 10 itself, with evident advantages in terms of costs, overall dimensions, weight, and efficiency.

Contrary to the "parallel hybrid" propulsion system of the known type, the thermal engine 10 is not integrally joined to the driving wheel 22 and the respective revolution speeds can thus be disengaged. Hence, this allows to operate the thermal engine 10 at ideal revolution speeds both in terms of consumption and emission of polluting substances.

Figure 3:
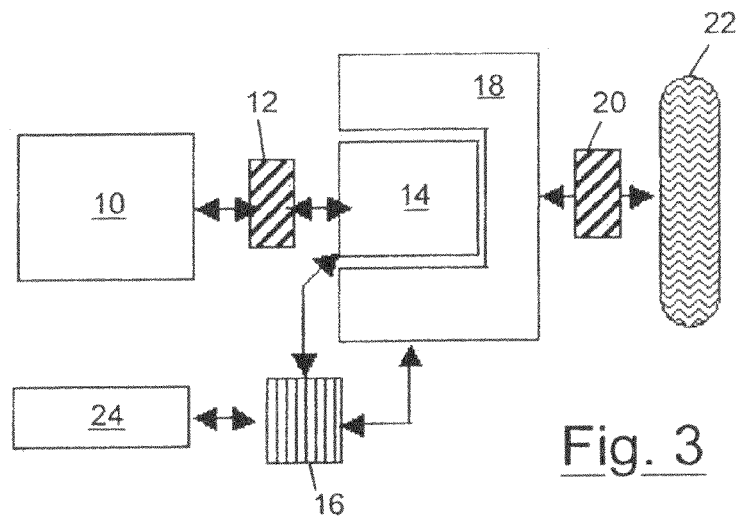
FIG. 3 is a schematic representation of a first variant of the embodiment shown in FIG. 2.

FIG. 3 shows a possible preferred variant of the "combined hybrid" propulsion system according to the invention. The two electric machines 14 and 18 are mounted in a concentric manner, in such a way that the rotor of the second electric machine 18 is integrally joined to a rotating stator of the first electric machine 14. This variant allows an efficient reduction of the overall dimensions and is thus particularly indicated for motorcycles and motor scooters of small dimensions.

Figure 4:
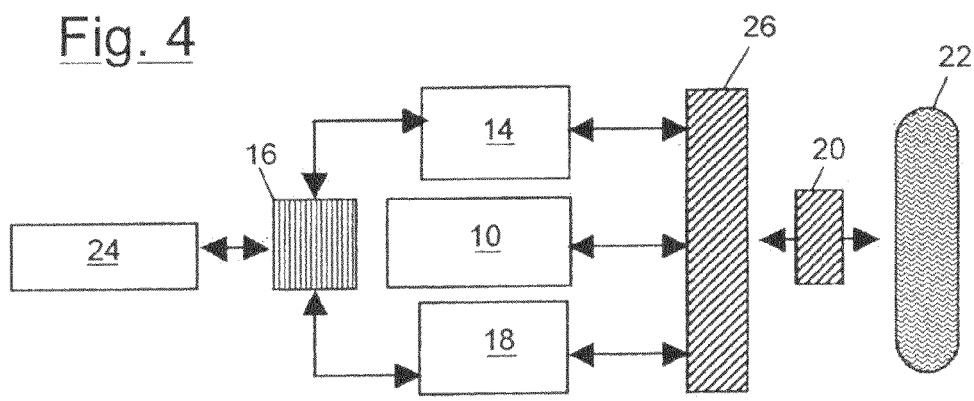
FIG. 4 is a schematic representation of a second variant of the embodiment shown in FIG. 2.

FIG. 4 instead shows a further preferred variant of the "combined hybrid" propulsion system according to the invention. In this variant, the thermal engine 10 and both the electric machines 14 and 18 are connected to the mechanical connection means 20 for the transmission of motion to the driving wheel 22 through the interposition of an epicyclic reduction gear 26.

Figure 5:
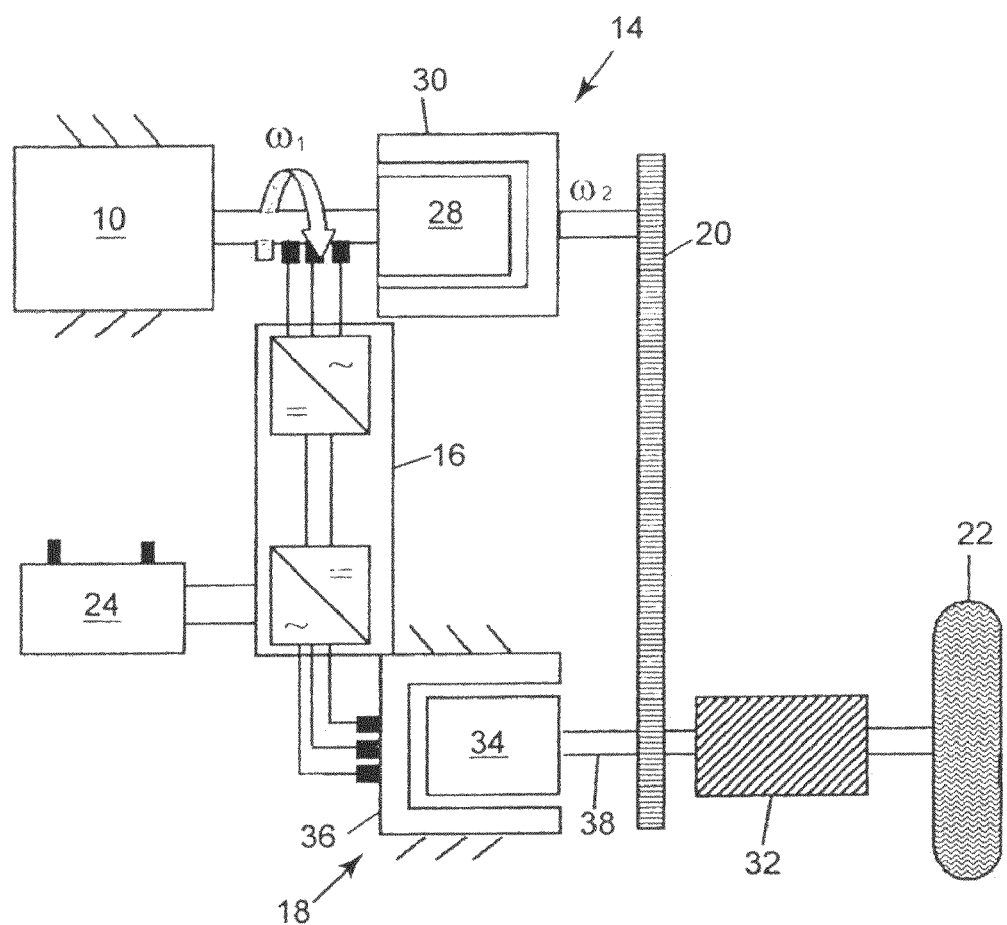
FIG. 5 is a schematic representation of a possible implementation on a motor scooter of the embodiment shown in FIG. 2.

FIG. 5 shows a possible implementation of the "combined hybrid" propulsion system according to the present invention. Such implementation, provided for exemplifying but non-limiting purposes, particularly refers to two-wheeled vehicles, such as for example motor scooters, and it is capable of replacing the conventional continuous variation transmission (CVT) gearbox.

The thermal engine 10 is journalled to the stator 28 of the first electric machine 14, which can operate both as generator and as a propeller, as better specified further ahead. In this configuration, the stator 28 is capable of rotating driven by the shaft of the thermal engine 10. The rotor 30 of the first electric machine 14 is thus joined integrally, through mechanical connection means 20 made up of, for example, a synchronous belt or by a shaft, to the rotor 34 of the second electric machine 18. On the contrary, the stator 36 of the second electric machine 18 is rigidly constrained to a fixed part of the framework of the motorcycle and thus cannot rotate. The rotor 34 of the second electric machine 18 is joined integrally to an input shaft 38 to a final reduction gear 32 and, consequently, to the driving wheel 22 of the motorcycle.

The operating conditions of the hybrid propulsion and transmission system for motorcycles according to the present invention depend on the ratio between the revolution speed $\omega_1$ of the thermal engine 10 and $\omega_2$ of the first electric machine 14, which can be summarised as follows.

Case 1: $\omega_1 > \omega_2$

In this condition the thermal engine 10, which rotates at a higher speed, rotates the rotor 30 of the first electric machine 14, which thus ends up operating as a generator. Part of the power supplied by the thermal engine 10 is thus transferred to the mechanical connection 32 and hence subsequently to the driving wheel 22, while the remaining part is converted into electric power by the first electric machine 14 and transferred, through the electric and/or electronic connection means 16, either to the second electric machine 18, which converts its into further mechanical power to be conveyed to the driving wheel 22, or to the accumulator devices 24, or else to both, depending on the requirements.

Thus, should the revolution speed $\omega_1$ of the thermal engine 10 be higher than the revolution speed $\omega_2$ of the first electric machine 14, such first electric machine 14 operates as a generator, while the second electric machine 18 operates as a propeller.

Case 2: $\omega_1 = \omega_2$

Should the revolution speed of the thermal engine 10 integrally joined to the stator 28 of the first electric machine 14 be equivalent to the revolution speed of the rotor 30 of the same electric machine 14, such electric machine 14 shall operate as an electromagnetic joint, absorbing any current it might be supplied with either by the first electric machine 18, or by the accumulator devices 24, or else by both. Thus, in this case, the first electric machine 14 operates as an electromagnetic joint, while the second electric machine 18 can operate as a generator to supply, also parallel to the accumulator devices 24, the first electric machine 14.

Case 3: $\omega_1 < \omega_2$

Once the thermal engine 10 has reached its maximum revolution speed, the first electric machine 14 starts operating as a propeller and it is supplied, through the electric and/or electronic connection means 16, either by the accumulator devices 24, or by the second electric machine 18, operating in this case as a generator, or else by both.

Thus, if the revolution speed $\omega_1$ of the thermal engine 10 is lower than the revolution speed $\omega_2$ of the first electric machine 14, such first electric machine 14 operates as a propeller, while the second electric machine 18 can operate as a generator for supplying, also parallel to the accumulator devices 24, the first electric machine 14.

Dimension-wise, in order to be mounted on a motor scooter, the second electric machine 18 may have overall dimensions diametrically analogous to the ones of the clutch bell, not present in motor scooters provided with the system according to the invention due to the elimination of the entire CVT transmission group. On the other hand, regarding the first electric machine 14, it can be preferably smaller with respect to the second electric machine 18, in that the maximum torque that such first electric machine 14 should transmit is equivalent to the one supplied by the thermal engine 10.

Therefore, due to the presence of two electric machines 14 and 18 positioned downstream of the internal combustion engine 10, such an engine 10 can be disengaged mechanically from the driving wheel 22 and, where possible, it can be controlled regardless of the road load and the speed of the vehicle. In this manner, the internal combustion engine 10 can operate mainly in a stable manner, thus at fixed revolution speeds, and can possibly be switched off in the steps when the vehicle stops. The internal combustion engine 10 can be re-started by one of the two electric machines 14 or 18 while the vehicle is moving, the start of the vehicle itself on the contrary being possibly performed, for example, by means of the other electric machine.

The possibility to disengage the internal combustion motor 10 from the driving wheel 22 allows to control the acceleration and deceleration steps, trying to make the motor 10 itself operate at ideal levels as far as emission of polluting substances and consumptions are concerned.

Having one of the two electric machines 18 integrally joined to the driving wheel 22, the system according to the invention allows to recover energy during deceleration and braking steps. Furthermore, it is possible to exploit such electric machine 18 for the propulsion, manufacturing a vehicle locally free of gaseous and acoustic emissions.

It has thus been observed that the hybrid propulsion and transmission system for motorcycles according to the present invention attains the objectives outlined beforehand, allowing in particular to obtain the following advantages:

Independence of the thermal engine from the driving wheel or from the driving wheels of the motorcycle with the possibility of operating such thermal engine at ideal levels of efficiency both in terms of emission of polluting substances and consumptions;

Possibility to start the thermal engine in a silent manner, switch such a thermal engine off when the vehicle stops and re-start it only upon reaching the speed preset by means of one of the two electric machines mounted on the vehicle itself;

Electric propulsion of the motorcycle, with the consequent gaseous and acoustic emissions locally absent;

Recovery of energy upon braking and decelerating;

Lower dispersion during the transmission of power from the thermal engine to the driving wheel; and Possibility to vary the transmission ratio in a sequential manner.

The hybrid propulsion and transmission system for motorcycles of the present invention thus conceived is in any case susceptible to various modifications and variants, all of which fall within the same inventive concept; furthermore, all details can be replaced by other technically equivalent elements. In practice, the materials used, alongside the shapes and dimensions, may vary depending on the technical requirements.

The scope of protection of the invention is thus defined by the claims attached.

The invention claimed is:

1. Hybrid propulsion and transmission system for a motorcycle of the type comprising at least an internal combustion engine (10) having a shaft and at least one driving wheel (22), the system comprising a first electric machine (14) having a rotating stator and a rotor (30), provided with first mechanical connection means (12) to said at least one internal combustion engine (10), and a second electric machine (18) having a rotor (34), coupled with said first electric machine (14) through electric and/or electronic connection means (16) and coupled to said at least one driving wheel (22) through second mechanical connection means (20) said first electric machine (14) being coupled with said second electric machine (18) and with said at least one driving wheel (22) through said second mechanical connection means (20), wherein the shaft of said internal combustion engine (10) is journalled to a rotating stator (28) of said first electric machine (14), so that said stator (28) is capable of being rotatably driven by the shaft of said internal combustion engine (10).

2. Hybrid propulsion and transmission system according to claim 1, additionally comprising one or more accumulator devices (24) directly connected to said electric and/or electronic connection means (16).

3. Hybrid propulsion and transmission system according to claim 1, characterised in that said first electric machine (14) and said second electric machine (18) are mounted in a concentric manner, in such a way that the rotor (34) of said second electric machine (18) is integrally joined to the rotating stator of said first electric machine (14).

4. Hybrid propulsion and transmission system according to claim 1, characterised in that said internal combustion engine (10) and said first (14) and second (18) electric machines are connected to said second mechanical connection means (20) for the transmission of the motion to said at least one driving wheel (22) through the interposition of an epicyclic reduction gear (26).

5. Hybrid propulsion and transmission system according to claim 1, characterised in that the rotor (30) of said first electric machine (14) is integrally joined to the rotor (34) of said second electric machine (18) through said second mechanical connection means (20).

6. Hybrid propulsion and transmission system according to claim 5, characterised in that the stator (36) of said second electric machine (18) is rigidly constrained to a fixed part of the framework of said motorcycle.

7. Hybrid propulsion and transmission system according to claim 5, characterised in that said rotor (34) of said second electric machine (18) is integrally joined to an input shaft (38) at a final reduction gear (32), integrally joined in turn to said at least one driving wheel (22).

8. Hybrid propulsion and transmission system according to claim 1, characterised in that said first (12) and second (20) mechanical connection means are selected from the group made up of:
a connecting shaft;
a trapezoidal belt;
a synchronous belt;
a parallel axes reduction gear;
an epicyclic reduction gear;
a reduction gear with a worm and toothed wheel; and
a conical-wheeled reduction gear.

9. Hybrid propulsion and transmission system according to claim 1, characterised in that said electric and/or connection means (16) are made in the form of diode bridges and/or inverters.

10. Hybrid propulsion and transmission system according to claim 2, characterised in that said one or more accumulator devices (24) are made up of batteries based on Pb, Pb-gel, Ni—Mh or Li-Ion.

11. Hybrid propulsion and transmission system according to claim 2, characterised in that said one or more accumulator devices (24) are made up of supercapacitors.

12. Hybrid propulsion and transmission system for a motorcycle of the type comprising at least an internal combustion engine (10) having a shaft and at least one driving wheel (22), the system comprising a first electric machine (14) having a rotor (30) and a stator (28), provided with first mechanical connection means (12) to said at least one internal combustion engine (10), and a second electric machine (18), coupled with said first electric machine (14) through electric and/or electronic connection means (16) said second electric machine being also coupled to said at least one driving wheel (22) through second mechanical connection means (20), said first electric machine (14) being coupled with said second electric machine (18) and with said at least one driving wheel (22) through said second mechanical connection means (20), wherein the shaft of said internal combustion engine (10) is journalled to a rotating stator (28) of said first electric machine (14), so that said stator (28) is capable of being rotatably driven by the shaft of said internal combustion engine (10), the rotor (30) of said first electric machine (14) being integrally joined to a rotor (34) of said second electric machine (18) through said second mechanical connection means (20), said second electric machine (18) having a stator (36) that is rigidly constrained to a fixed part of framework of said motorcycle, and the rotor (34) of said second electric machine (18) being integrally joined to an input shaft (38) at a final reduction gear (32) that is integrally joined in turn to said at least one driving wheel (22).

13. Hybrid propulsion and transmission system according to claim 12, additionally comprising one or more accumulator devices (24) directly connected to said electric and/or electronic connection means (16).

14. Hybrid propulsion and transmission system for a motorcycle of the type comprising at least an internal combustion engine (10) having a shaft and at least one driving wheel (22), the system comprising a first electric machine (14) having a stator (28) and a rotor (30), provided with first mechanical connection means (12) to said at least one internal combustion engine (10), and a second electric machine (18) having a rotor (34) and a stator (36), coupled with said first electric machine (14) through electric and/or electronic connection means (16) and coupled to said at least one driving wheel (22) through second mechanical connection means (20), said first electric machine (14) being coupled with said second electric machine (18) and with said at least one driving wheel (22) through said second mechanical connection means (20), wherein the shaft of said internal combustion engine (10) is journalled to a rotating stator (28) of said first electric machine (14), so as said stator (28) is capable of being rotatably driven by the shaft of said internal combustion engine (10), a rotor (30) of said first electric machine (14) being integrally joined to a rotor (34) of said second electric machine (18) through said second mechanical connection means (20), said second electric machine (18) having a stator (36) that is rigidly constrained to a fixed part of framework of said motorcycle, and a rotor (34) of said second electric machine (18) being integrally joined to an input shaft (38) at a final reduction gear (32), said input shaft being integrally joined in turn to said at least one driving wheel (22), and wherein operating conditions of the system depend on a ratio between a revolution speed ($\omega_1$) of said internal combustion engine (10) and a revolution speed ($\omega_2$) of said first electric machine (14).

15. Hybrid propulsion and transmission system according to claim 14, additionally comprising one or more accumulator devices (24) directly connected to said electric and/or electronic connection means (16).

16. Hybrid propulsion and transmission system according to claim 14, characterised in that said internal combustion engine (10) and said first (14) and second (18) electric machines are connected to said second mechanical connection means (20) for the transmission of the motion to said at least one driving wheel (22) through the interposition of an epicyclic reduction gear (26).

* * * * *